United States Patent [19]

Andrews

[11] 4,174,268
[45] Nov. 13, 1979

[54] ELECTRODE GUIDE

[75] Inventor: James D. Andrews, Birmingham, Mich.

[73] Assignee: TRW Inc., Cleveland, Ohio

[21] Appl. No.: 938,948

[22] Filed: Sep. 1, 1978

[51] Int. Cl.² .......................... B23P 1/02; B23P 1/12
[52] U.S. Cl. .......................... 204/129.55; 204/129.6; 204/129.7; 204/224 M; 204/286; 204/297 R; 204/225
[58] Field of Search ............. 204/129.55, 129.6, 129.7, 204/224 M, 297 R, 286, 225

[56] References Cited
U.S. PATENT DOCUMENTS

| | | | |
|---|---|---|---|
| 2,764,540 | 9/1956 | Farin et al. | 204/224 M X |
| 3,120,482 | 2/1964 | Williams | 204/129.6 X |
| 3,196,093 | 7/1965 | Williams | 204/129.7 X |
| 3,202,598 | 8/1965 | Covington et al. | 204/224 M |
| 3,326,785 | 6/1967 | Williams | 204/129.7 X |
| 3,990,959 | 11/1976 | Payne et al. | 204/224 M X |

*Primary Examiner*—John H. Mack
*Assistant Examiner*—D. R. Valentine

[57] ABSTRACT

An electrode guide is used in an apparatus for electrochemically drilling an axial hole in a longitudinally extending workpiece such as a suture needle. An electrode is telescopically received in one end of the tubular guide and the workpiece in the other. Electrically nonconductive inserts are provided in the guide to position the electrode and the workpiece in axial alignment. The depth of the hole to be drilled is limited by one of the inserts which abuts the end of the needle to prevent further axial motion when the hole has reached a predetermined depth. A plurality of the electrodes are disposed in a side by side arrangement. The inlet end portions of adjacent electrodes diverge to facilitate connecting an electrolyte conducting conduit to each electrode.

46 Claims, 12 Drawing Figures

ELECTRODE GUIDE

BACKGROUND OF THE INVENTION

The present invention relates to the art of electrochemical machining, and more particularly to the art of aligning electrodes and workpieces during an electrochemical hole drilling operation to form suture needles.

A surgical suture needle must have one end of the suture securely attached to the needle without enlargement of the needle. In the past, suture needles have been provided with an axial hole in the shank end of the needle. Suture needles have been made by drilling and crimping the needle as shown in U.S. Pat. No. 2,620,028. Suture needles have also been made by swaging a maleable metal tube onto a hardened steel tip as illustrated in U.S. Pat. No. 1,591,021. Both of these methods involved ordinary machining processes which are difficult because of the small size of the workpieces.

The problem of drilling a hole along the central axis of a cylindrical member is old and many attempts have been made to provide a mechanical jig which will hold a drill on the central axis. Some U.S. Pat. Nos. disclosing devices of this type are 2,459,013, 1,459,823, 475,664, and 460,883. Again the size of the workpiece makes it difficult to devise a jig which can effectively keep a small workpiece, such as a suture needle and an even smaller drill in coaxial alignment.

SUMMARY OF THE INVENTION

The present invention provides a new and improved apparatus for drilling holes in workpieces such as suture needles. The holes are drilled with a known electrochemical machining apparatus. This apparatus includes a source of electrolyte under pressure and an electrode to direct a flow of the electrolyte against one end of the suture needle. As the charged electrolyte drills into the workpiece, the workpiece is advanced toward the electrode.

In one preferred embodiment of the present invention, a generally tubular electrode guide engages both the electrode and the suture needle to assure that they are in axial alignment. The guide includes a tubular member which slides over and is supported by the main body portion of the electrode. Inside the tube are a pair of annular inserts one of which engages the nozzle tip portion of the electrode to hold it securely in the center of the tube. The second insert aligns the workpiece with the nozzle tip of the electrode to assure that the hole is drilled along the central axis of the workpiece.

In a second preferred embodiment both the electrode and the electrode guide are connected with a support plate. The electrode guide includes a tubular plastic insert in one end of which the nozzle tip of the electrode is supported. The workpiece is supported coaxial with the electrode nozzle tip by the opposite end of the tubular insert.

When working on such small workpieces as suture needles, a relatively large amount of space is occupied by the apparatus which supplies the electrolyte to the electrode. In a machine adapted to drill a hole in each of many suture needles simultaneously it is important to make the connections between the electrolyte source and the electrode in as space-efficient a manner as possible. This is accomplished by using bent electrodes with inlet end portions of adjacent electrodes extending in opposite directions. Accordingly, a main body portion of all the electrodes lie in one plane and the inlet end portions of alternate electrodes extend above and below this plane. This pattern of arranging the electrode inlet end portions increases the space between adjacent inlet portions to facilitate connecting each electrode with the electrolyte supply.

Accordingly it is an object of the present invention to provide a new and improved method and apparatus for electrochemically forming a relatively small axially extending hole in a relatively small longitudinally extending workpiece, such as a suture needle.

Another object of this invention is to provide a new and improved method and apparatus for electrochemically forming a hole in a workpiece wherein a guide for positioning the workpiece relative to an electrode is supported by the electrode.

It is a further object of the present invention to provide a new and improved method and apparatus for electrochemically forming a relatively small hole in a relatively small workpiece by using a guide which telescopically receives both the workpiece and an electrode to position them relative to each other.

It is a further object of the present invention to provide a new and improved apparatus for electrochemically drilling a hole and wherein the apparatus includes a plurality of electrodes mounted in a side by side arrangement with inlet end portions of adjacent electrodes diverging to facilitate connecting each electrode to an electrolyte supply.

DESCRIPTION OF DRAWINGS

These and other objects and features of the present invention will become more apparent upon reading the specification in connection with the accompanying drawings in which.

DESCRIPTION OF PREFERRED EMBODIMENTS OF THE INVENTION

Figure 1:
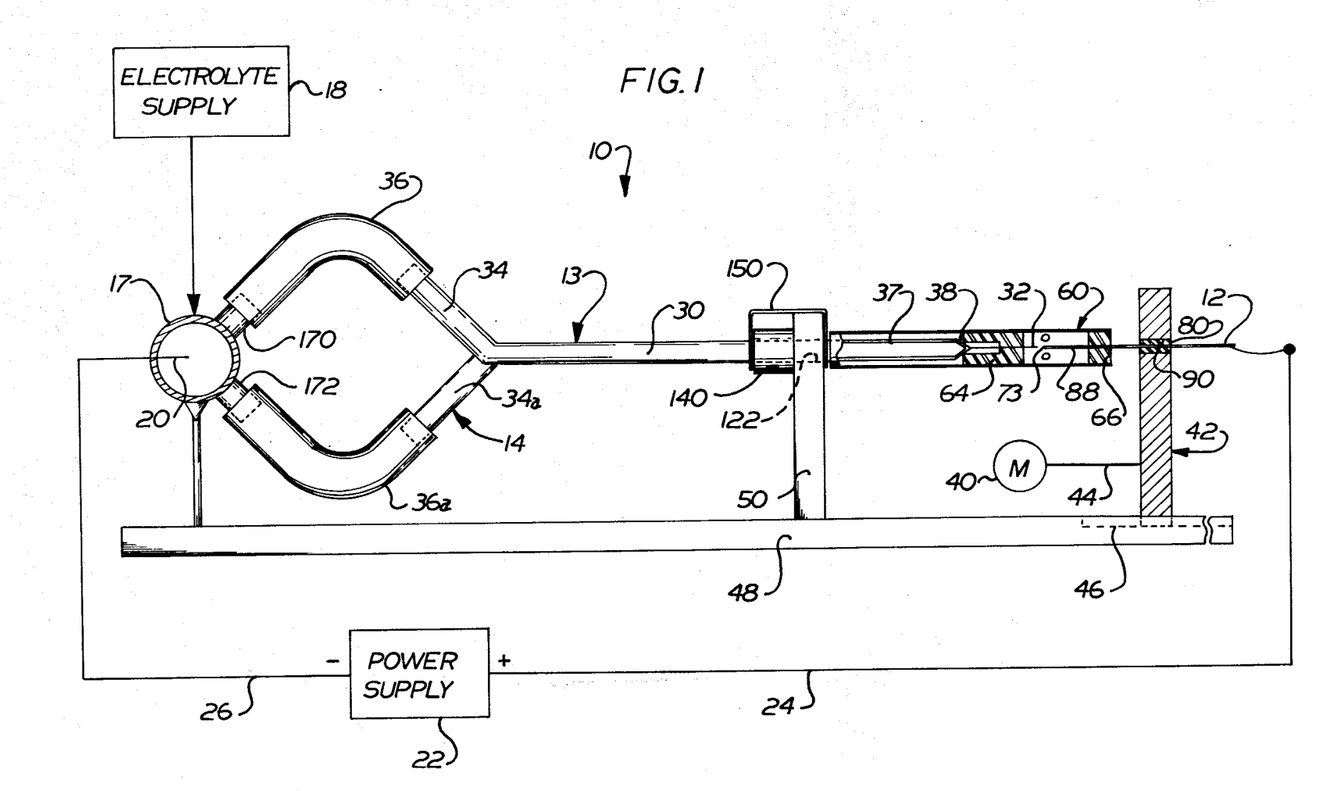
FIG. 1 is a partly schematic elevational view of the apparatus of the present invention.
Figure 2:
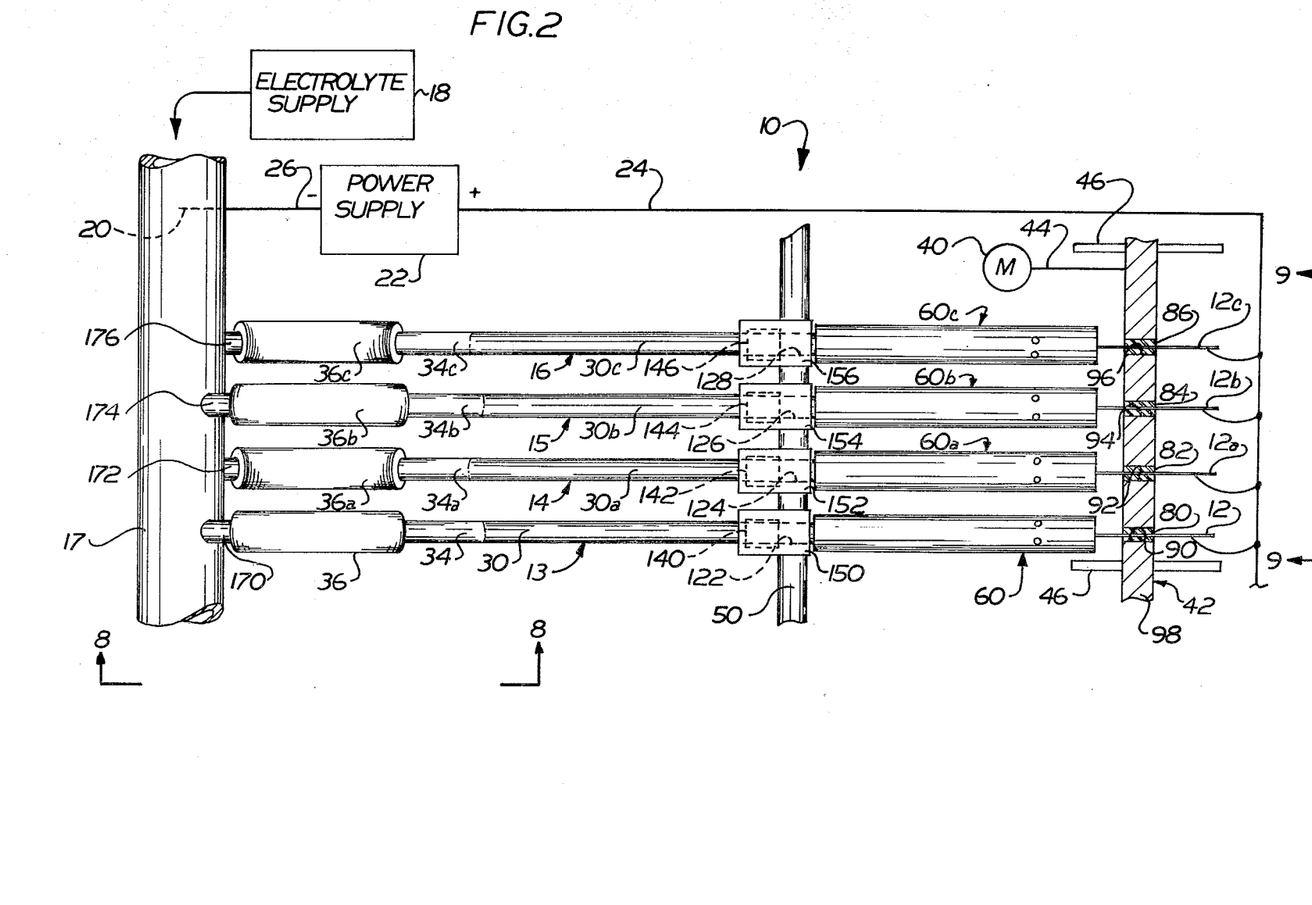
FIG. 2 is a plan view of the apparatus of FIG. 1.

An apparatus 10 for electrochemically drilling a hole in a workpiece 12 is illustrated schematically in FIGS. 1 and 2. The apparatus 10 includes a plurality of substantially identical tools 13, 14, 15, and 16 which direct a flow of electrolyte against workpieces 12, 12a, 12b and 12c in a manner similar to that disclosed in U.S. Pat. No. 3,793,170. The tools or electrodes 13, 14, 15, and 16 are connected in fluid communication with a manifold or header 17 which is supplied with a flow of electrolyte from the electrolyte source shown schematically at 18.

The electrodes 13, 14, 15, and 16 are substantially the same in construction, in manner of operation and in the way each is connected with the manifold 17. In addition, the workpieces 12, 12a, 12b and 12c are also substantially identical. Consequently, except where it is necessary to distinguish between individual electrodes 13, 14, 15, and 16 and individual workpieces 12, 12a, 12b, and 12c, only one electrode 13 and one workpiece 12 will be described.

During operation of the apparatus 10, an electrical potential is established between the workpiece 12 and an electrode wire 20 in the header 17. Thus, the workpiece 12 is connected with the anode or positive terminal of a direct current power supply 22 by a lead 24. The electrode wire 20 is connected to the cathode or negative terminal of the power supply 22 by lead 26. The electrolyte is electrically conductive and effects an electrochemical removal of material in a manner similar to that disclosed in U.S. Pat. Nos. 3,403,084 and 3,409,534. It is also contemplated that the polarity of leads 24 and 26 could be reversed or that an alterating current could be used.

The tool 13 (FIG. 1) is formed of a suitable dielectric material which in the illustrated embodiment of the invention is glass. The glass tool 13 includes a cylindrical main body portion 30, a cylindrical nozzle tip portion 32 coaxial with the body portion, and an inlet portion 34 disposed at a angle to the main body portion. The header 17 is connected in fluid communication with the inlet portion 34 of the tool 13 by a flexible conduit 36. The tool 13 has a generally cylindrical passage 37 through the inlet portion 34 and through the main body portion 30. The passage tapers to a much smaller diameter at the nozzle tip portion 32. The nozzle tip 32 is a relatively long slender tube connected to the main body by a tapering section 38 having a generally frustroconical configuration.

During operation of the apparatus 10, the power supply 22 is effective to maintain an electrical potential between the electrolyte and the workpiece 12. At this time the electrolyte flows under pressure from the header 17 through the flexible conduit 36 into the electrode 13. The electrolyte is supplied at a pressure between 10 and 70 P.S.I. It is preferred to use pressures between 40 and 60 P.S.I. The electrolyte flows through the central passage 37 in the electrode 13 and through the tapering section 38 where it accelerates. Electrolyte is discharged from the nozzle tip 32 at a high speed and is directed against the workpiece 12 to drill electrochemically a hole in a well known manner.

Figure 3:
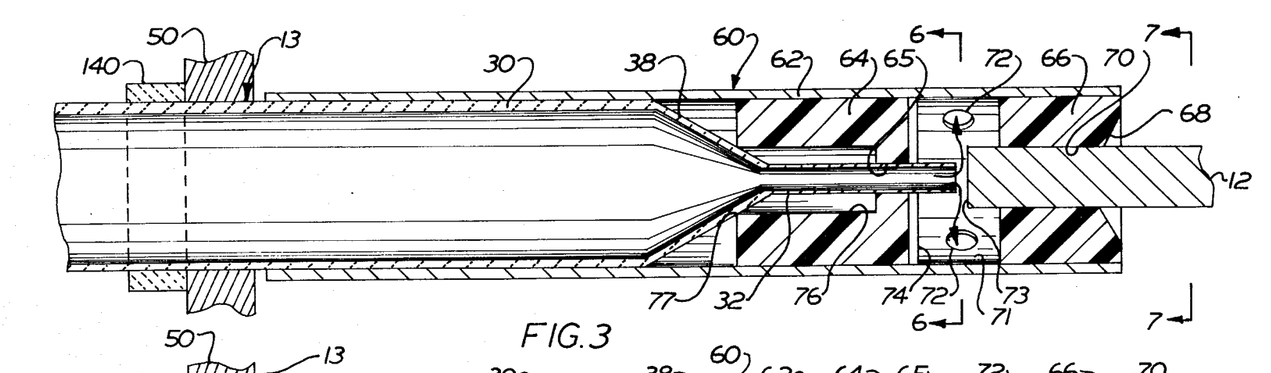
FIG. 3 is an enlarged sectional view of a portion of FIG. 1 illustrating the relationship between an electrode, a guide and a workpiece before material is removed from the workpiece by an electrochemical hole drilling operation.
Figure 4:
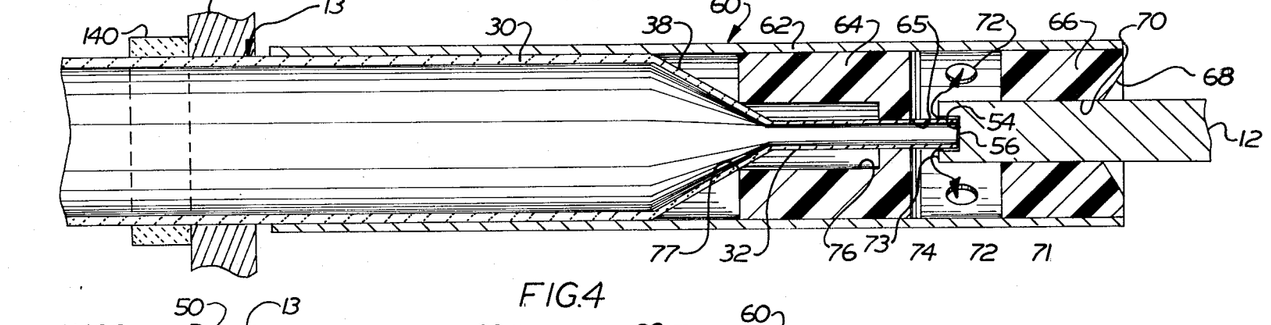
FIG. 4 is a view similar to FIG. 3 but showing the workpiece with a hole partially drilled.
Figure 5:
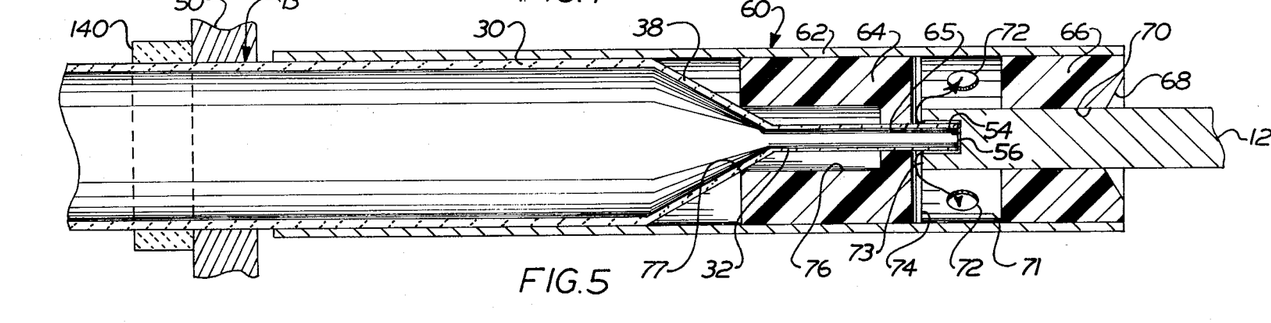
FIG. 5 is a view similar to FIG. 3 but showing the hole drilled to its full depth and with further drilling of the hole prevented by the guide.
Figure 6:
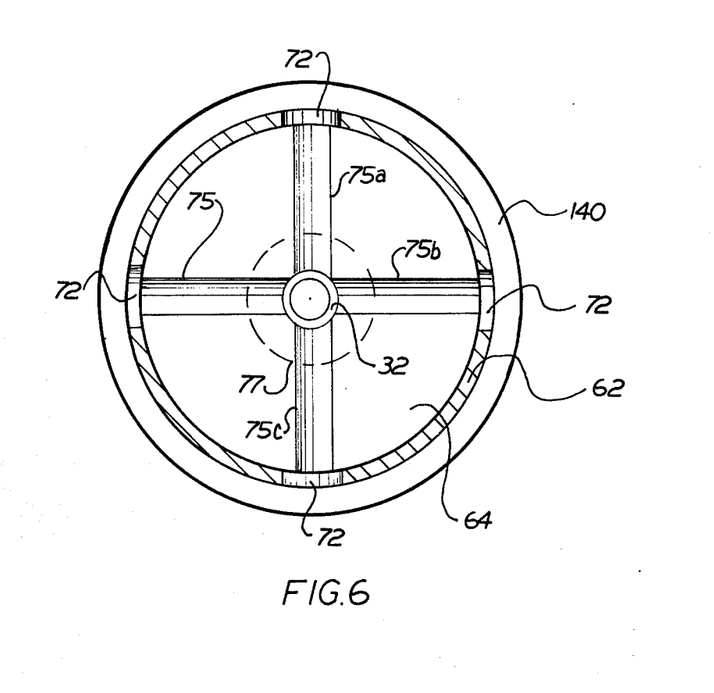
FIG. 6 is an enlarged sectional view taken along line 6—6 of FIG. 3 illustrating the relationship between the outer portion of an electrode nozzle and a plurality of electrolyte flow passages.
Figure 7:
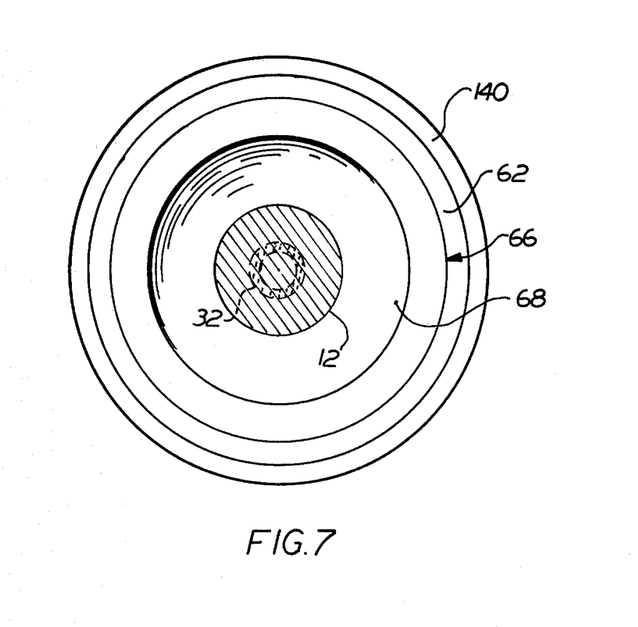
FIG. 7 is a view similar to FIG. 6, but taken along line 7—7 of FIG. 3 further illustrating the relationship between the guide and the workpiece.

As the drilling proceeds, the workpiece 12 is advanced from the position shown in FIG. 3, through the position shown in FIG. 4 to the position shown in FIG. 5. This results in the electrode nozzle tip 32 being telescopically received in the hole as the hole is formed. The holding assembly 42 (FIG. 1) supports the workpiece 12 and is slidably mounted in grooves or ways 46 on a machine base 48 to enable it to move toward or away from the electrode 13. A motor shown schematically at 40 in FIG. 1 advances the holding assembly 42 by rotating a threaded shaft 44 which engages the holding assembly. It is also contemplated that, if desired, the member 50 which supports the electrode 13 may be movable and that the holding assembly 42 could be fixedly connected with the machine base 48. In either case, the rate at which the workpiece 12 and electrode 13 approach each other is regulated to maintain the distance between the end 52 of the electrode and the bottom 54 of the hole constant.

An electrode guide 60 is provided to hold the nozzle tip 32 and the workpiece 12 in axial alignment (FIG. 3). The guide 60 is especially adapted to align a slender workpiece 12 such as a suture needle with the electrode 13. In the finished product, the connection between the suture and suture material the needle must be as smooth as possible. For this reason a hole is bored axially into the blunt end of the suture needle. One end of a length of suture material is then inserted into the hole and the needle crimped to securely grip the material.

The hole drilled into the end of the needle should be centered along the axis of the needle. Surgical suture needles have a relatively small maximum diameter and suture threads are not much smaller in diameter. Thus the hole must be carefully aligned with the needle lest the drilling be off center and produce a slot rather than a hole.

FIG. 2 illustrates one preferred embodiment of electrode guides 60, 60a, 60b, and 60c built in accordance with the present invention. Guides 60, 60a, 60b, and 60c are used in association with electrodes 13, 14, 15, and 16 respectively. The guides 60, 60a, 60b, and 60c are substantially identical and only one will be described. The guide 60 holds the electrode 13 and the workpiece 12 in axial alignment. While the present invention is especially well adapted for drilling axial holes in suture needles, it is also contemplated that it could be equally well used to drill holes in other slender workpieces or to drill holes parallel to but not coincident with the central axis of a workpiece.

The guide 60 (FIG. 3) is adapted to engage the electrode 13 and the workpiece 12. The hollow electrode 13 of the present invention is formed of glass and has an elongate nozzle tip portion 32 with a relatively small diameter and a main body portion 30 with a relatively larger diameter. The tip 32 and body 30 are connected by a tapering portion 38.

In accordance with one feature of the present invention, the guide 60 is supported by the glass electrode 13. The guide 60 includes a cylindrical tubular member 62 (FIG. 3) which telescopes over the outside of the body 30 of the electrode 13. The inside diameter of the tubular member 62 is approximately the same as the outside diameter of the main body portion 30 of the electrode 13. This enables the guide 60 to slide over the outside of the electrode 13. The tight fit between the tubular member 62 and electrode 13 is effective to keep the electrode and the guide coaxial by permitting only minimal radial movement of the guide with respect to the electrode.

An insert 64 is effective to position the tubular member 62 in a coaxial relationship with the relatively small cylindrical tip portion 32 of the electrode 13. The annular insert 64 is made of an electrically non-conducting material such as nylon or teflon. The insert 64 has a cylindrical outside surface which is sealingly connected with the inside of the tubular member 62. A central passage through the insert 64 has a first cylindrical portion 65 with a diameter the same as the diameter of the outside of the nozzle tip portion 32. When the nozzle tip 32 is inserted into the guide 60, the tip slides through the the first cylindrical portion 65 of the annular insert 64 and is sealingly engaged by the insert.

The workpiece 12 is positioned in a coaxial relationship with the tip portion 32 of the electrode 13 by a second insert 66. The second annular insert 66 has a cylindrical outside surface which is sealingly connected with the inside of the tube 62. A slight taper 68 leads to the central passage 70 through the insert. The taper 68 serves to guide the workpiece 12 as it is inserted into the central cylindrical passage 70. The passage 70 has an inside surface which slidably and sealingly engages the workpiece 12 and holds it coaxial with the tube and nozzle tip 32 of the electrode 14.

The inserts 64 and 66 cooperate with the tubular member 13 to form a cylindrical chamber or cavity 71 (FIG. 3) in which the electrochemical machining operation occurs. In order to mount the guide 60 on the electrode 13, the guide is telescopically moved onto the electrode 13 until an end 77 of the insert 64 abuts the electrode nozzle. At this time, the tip portion 32 extends a predetermined distance into the cavity 71. The workpiece 12 is then telescopically moved through the insert 66 into the cavity 71. As the electrochemical machining operation continues, the extent of the telescopic relationship between the workpiece 12 and guide 60 is increased until a hole of the desired depth has been drilled (FIG. 5).

During the electrolytic removal of material from the workpiece 12, an electrolyte stream flows out of the nozzle tip 32 toward the workpiece 12 to drill a hole in a well known manner (FIGS. 3-5). After impinging against the workpiece 12, the electrolyte drains into the cavity 71 and out through holes 72. As the drilling continues the workpiece 12 is advanced toward the electrode 14 (FIG. 4). Forward motion of the workpiece 12 continues until the hole has reached the desired depth (FIG. 5). When the hole has reached its full depth, the leading end 73 of the workpiece 12 abuts the annular face 74 of the first insert 64.

The second portion 76 of the central passage through the insert 64 has a larger diameter than the first portion 65. The circular end 77 of this second portion 76 abuts the tapered portion 38 of the electrode 13. Thus when the hole has been drilled to the desired depth, the leading end 73 of the workpiece 12 abuts the end 74 of the insert 64. The opposite end 77 of the insert 64 bears upon the tapered portion 38 of the electrode 13. This prevents further axial motion of the workpiece 12 toward the electrode 13.

Figure 9:
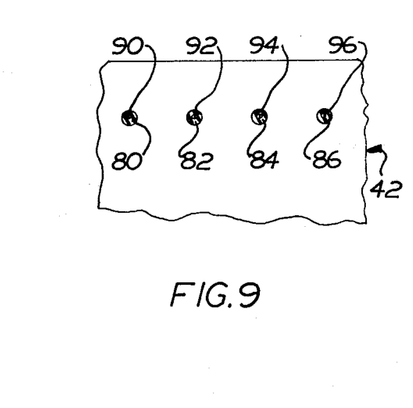
FIG. 9 is an enlarged view taken along the line 9—9 of FIG. 2 and illustrating the construction of workpiece holders with the workpieces omitted.

The workpieces 12, 12a, 12b, and 12c are substantially identical and each is held in the holding assembly 42 in the same manner. Although only one workpiece 12 and one clamp 80 is described it is understood that the same description applies as well to workpieces 12a, 12b, and 12c and to clamps 82, 84 and 86. (FIGS. 1, 2, and 9).

During set up the workpiece 12 is inserted through the annular clamp 80. One end portion 88 of the workpiece 12 extends beyond the clamp 80 toward the guide 60. However, the workpiece 12 may not extend toward the insert 64 the same distance as the workpieces 12a or 12b or 12c. For example, the workpiece 12 may extend farther toward the insert 64 than the workpieces 12a, 12b or 12c.

The depth limiting action of the guides 60, 60a, 60b, and 60c and the clamps 80, 82, 84, and 86 enables a hole of the same depth to be drilled in each of the workpieces 12, 12a, 12b, and 12c (FIG. 2). The annular clamps 80, 82, 84, and 86 (FIGS. 2 and 9) are made of an insulating or dielectric material such as rubber. The clamps are fixedly held in cylindrical passages 90, 92, 94, and 96 in a support base 98. The clamps 80, 82, 84, and 86 grip the workpieces 12, 12a, 12b, and 12c. This gripping action is sufficient to hold the workpieces 12, 12a, 12b and 12c against axial movement under the influence of forces applied against the workpieces by the streams of electrolyte from the electrodes 13, 14, 15 and 16.

During a hole drilling operation, the motor 40 moves the workpieces 12, 12a, 12b, and 12c simultaneously toward the electrodes 13, 14, 15, and 16. However, when the leading end 73 of the workpiece 12 abuts annular surface 74 on the guide 60, the holes drilled in the remaining workpieces 12a, 12b and 12c may not yet have reached the desired depth. Further motion of the clamp assembly 42 causes the workpiece 12 to slip in the rubber clamp 80. This enables the holes in the remaining workpieces 12a, 12b, and 12c to be drilled to the depth determined by the distance between the ends 74 and 77 of the insert 64 in the guide 60.

When the leading end 73 of the workpiece 12 abuts the end face 74 of the first insert 64, the electrolyte flow path is not closed off. The end face 74 of the insert 64 is provided with a plurality of radially extending grooves or recesses 75, 75a, 75b, and 75c. These recesses 75, 75a, 75b, and 75c permit the electrolyte to flow even when the workpiece 12 abuts the insert 64 and axial motion of the workpiece relative to electrode 13 has stopped.

The apparatus 10 constructed in accordance with the present invention includes a plurality of electrodes 13, 14, 15, and 16 for simultanously drilling a hole in each of a plurality of workpieces 12, 12a, 12b, and 12c. In one preferred embodiment the electrodes 13, 14, 15, and 16 are supported by a member 50 (FIGS. 1 and 2) through which a plurality of parallel spaced apart cylindrical passages 122, 124, 126, and 128 (FIG. 2) have been provided. The member 50 is fixedly connected with the machine base 48.

The passages 122, 124, 126, and 128 are arrayed so that their axes are parallel and are disposed in a single plane. The passages 122, 124, 126, and 128 are sized to slidably engage the outside cylindrical surface of the electrodes 13, 14, 15, and 16, and one electrode extends through each passage. An annular collar 140, 142, 144, and 146 is fixedly connected with each electrode 13, 14, 15, and 16 respectively and abuts the member 50 to prevent axial motion of the electrode in one direction. The electrodes 13, 14, 15, and 16 are held against axial motion in the other direction by clips 150, 152, 154, and 156 which engage both a collar 140, 142, 144, or 156 and member 50.

Figure 8:
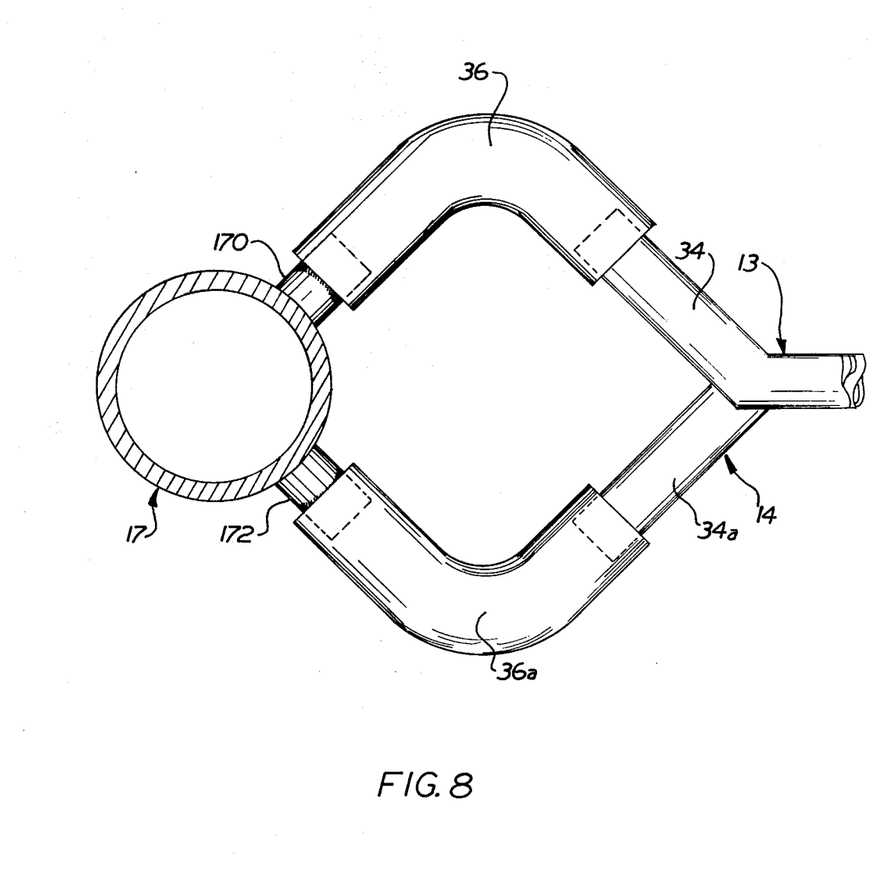
FIG. 8 is an enlarged sectional view taken along the line 8—8 of FIG. 2 and illustrating the diverging relationship between inlet end portions of adjacent electrodes.

The apparatus 10 constructed according to the present invention utilizes an extremely compact arrangement to connect the electrolyte header 17 to the electrodes 14 (FIGS. 1, 2, and 8). The inlet portion 34 of the electrode 13 is disposed at an angle to the body portion 30 of the electrode 13. A flexible conduit 36 connects the electrode 13 with an outlet 170 in the header 17.

When a plurality of electrodes 13, 14, 15, and 16 are mounted in side by side arrangement, alternate inlet portions 34, 34a, 34b, and 34c extend above and below the plane of the main bodies 30, 30a, 30b, and 30c. One end of a flexible conduit 36, 36a, 36b, and 36c is connected with each inlet portion 34, 34a, 34b, and 34c respectively. The opposite end of each conduit 36, 36a, 36b, and 36c is connected with an outlet 170, 172, 174, and 176 from the header 17 (FIG. 2). This arrangement greatly increases the space between adjacent pairs of inlets 34 and 34a, 34a and 34b, and 34b and 34c and adjacent pairs of outlets 170 and 172, 172 and 174, and 174 and 176. This arrangement facilitates connecting the conduits 36, 36a, 36b, and 36c to the electrodes 13, 14, 15, and 16 and to the outlets 170, 172, 174, 176 on the header 17.

Figure 10:
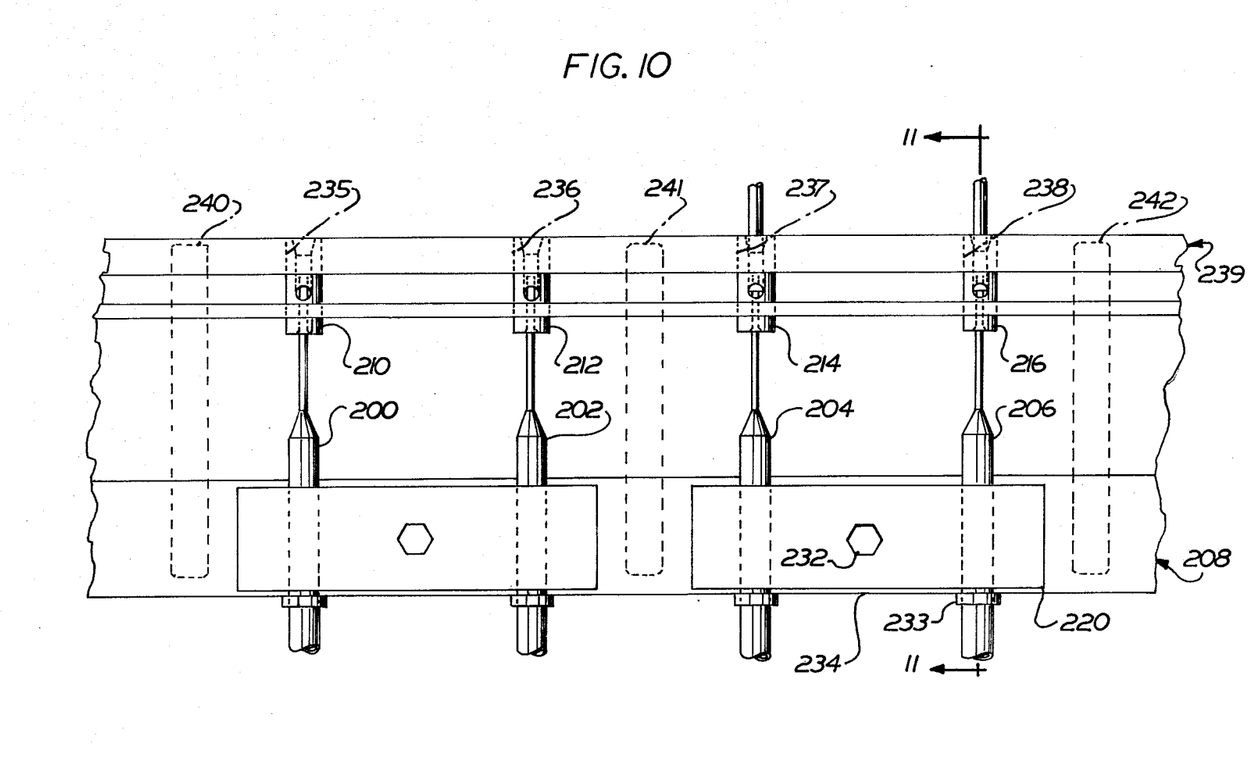
FIG. 10 is a plan view of a second embodiment of the present invention showing a plurality of electrodes and electrode guides mounted on a support plate.
Figure 11:
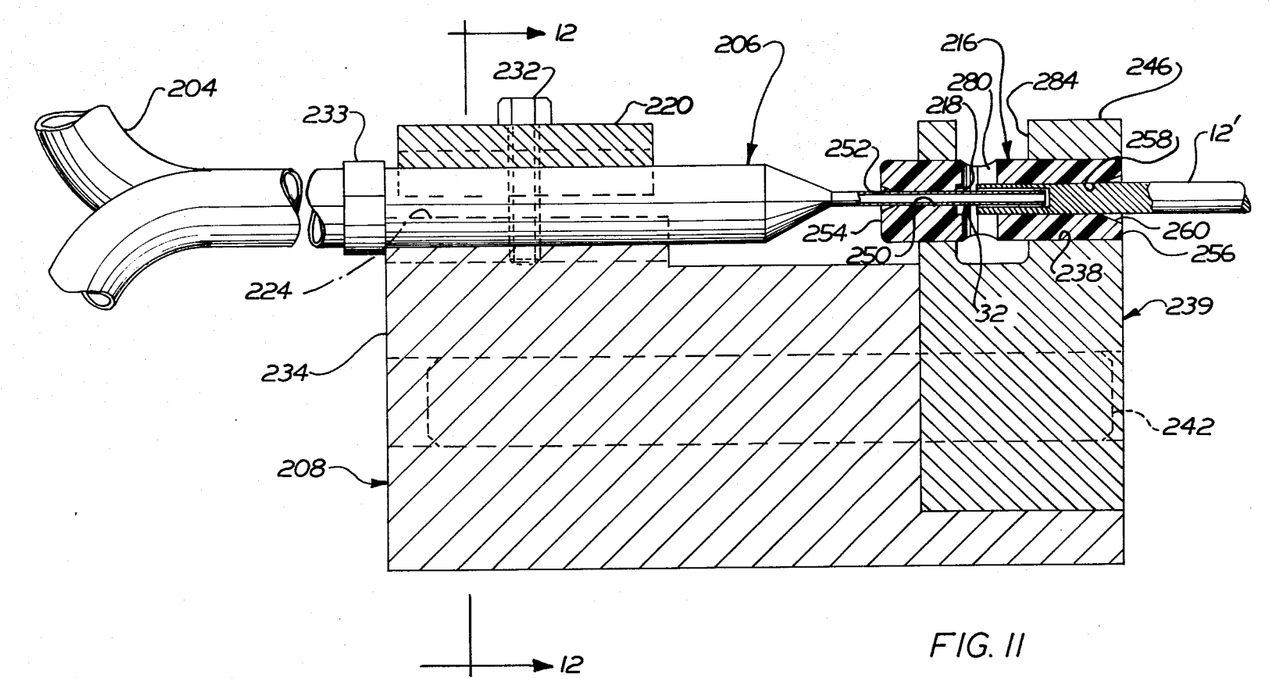
FIG. 11 is an enlarged sectional view taken along line 11—11 of FIG. 10 showing details of the construction of the electrode guides and support plate shown in FIG. 10.
Figure 12:
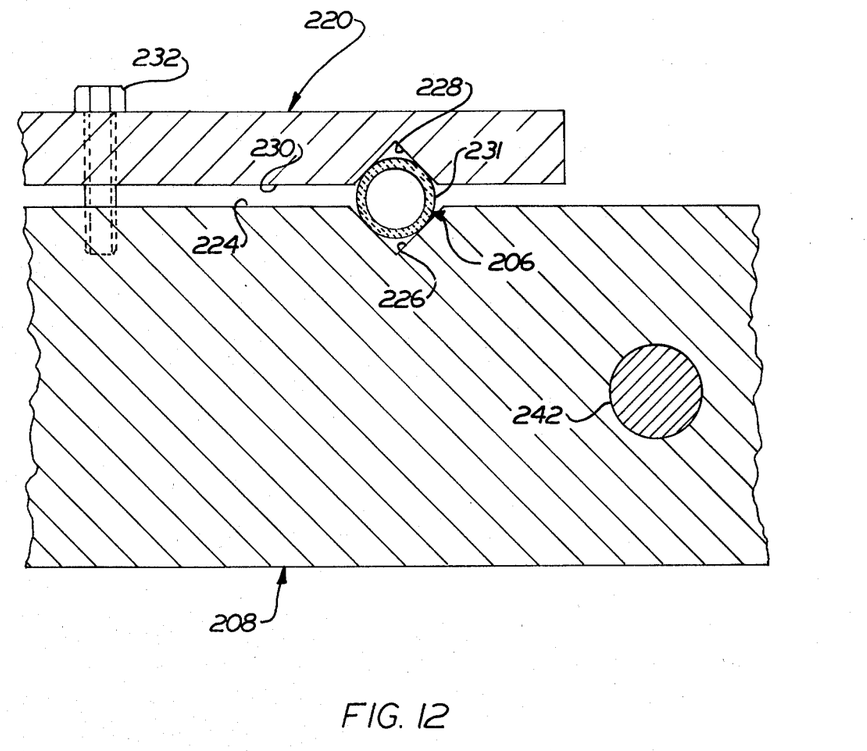
FIG. 12 is sectional view taken along line 12—12 of FIG. 11 and showing the method of mounting the electrodes of FIG. 10 to the support plate.

A second preferred embodiment of an electrode guide constructed in accordance with the present invention is disclosed in FIGS. 10-12 in which similar numerals have been used to designate similar parts. This embodiment may be preferred in certain circumstances. Although this embodiment is illustrated in FIGS. 10, 11, and 12 as having electrodes 200, 202, 204, and 206 and electrode guides 210, 212, 214, and 216 disposed in a horizontal plane, it is to be understood that other orientations of the electrodes and guides are within the scope of the present invention.

As illustrated in FIG. 10, a plurality of electrodes 200, 202, 204, and 206 are connected with a support plate 208. Electrode guides 210, 212, 214, and 216 are also connected with the support plate 208.

The electrodes 200, 202, 204, and 206 are substantially identical to those utilized in the first disclosed preferred embodiment (FIGS. 1-9) and to each other. In addition, the electrode guides 210, 212, 214, and 216 (FIG. 10) are substantially identical to each other. Consequently, only one electrode 206 and one electrode guide 216 will be described in detail, although it is to be understood that the description applies equally well to electrodes 200, 202, and 204 and to electrode guides 210, 212, and 214.

The workpiece 12' is substantially the same as the workpiece 12 shown in FIG. 1 and is supported in an assembly substantially identical to the holding assembly 42 illustrated in FIGS. 1 and 2. The holding assembly includes a motor and threaded shaft similar to the motor 40 and shaft 44 shown in FIGS. 1 and 2. When the motor is activated the workpiece 12' (FIG. 11) is brought into telescopic engagement with the electrode guide 216.

As the hole drilling operation proceeds, the nozzle tip 32' of electrode 206 is telescopically received in the workpiece 12' (FIG. 1). Telescopic motion continues until the hole reaches the desired depth. At this point the motor is reversed and the workpiece 12' is withdrawn from the electrode 206.

The electrode guide may have a suitable stop surface 218 to provide a depth limiting action such as is provided in the first embodiment (FIGS. 1-9). When the workpiece 12' abuts the stop surface 218, telescopic motion of the electrode 206 is stopped and the workpiece slips in the holder assembly until the motor is reversed. Suitable recesses are provided in the stop surface 218 to enable electrolyte to flow away from the end of the workpiece when it engages the stop surface.

Electrode 206 is rigidly held to the support plate 208 by a clamp bar 220. The top surface 224 (FIG. 11) of the support plate 208 is provided with an axially extending v-shaped groove 226 (FIG. 12). A similar groove 228 in the bottom surface 230 of the clamp bar 220 is aligned with the groove 226 in the support plate 208. When the electrode 206 is in place, the two grooves 226 and 228 are in tangent contact with the outside 231 of the electrode 206 along four lines. Once the electrode 206 is in place, the bolt 232 is gently tightened to hold the glass electrode 206 between the clamp bar 220 and the support plate 208.

Collar 233 (FIG. 11) is fixedly connected with the electrode 206 and serves to position the electrode in the proper axial location during set up by abutting edge 234 which extends transverse to groove 226 in the support plate 208.

In this second preferred embodiment, the tubular electrode guides 210, 212, 214, and 216 (FIG. 10) are supported in cylindrical passages 235, 236, 237, and 238 through a support block 239. The support block 239, in turn, is connected with the support plate 208 by dowel pins 240, 241, and 242. Thus the electrodes 200, 202, 204, and 206 and the electrode guides 210, 212, 214, and 216 are both connected with the support plate 208.

The tubular electrode guide 216 (FIG. 11) is held in the cylindrical passage 238 through the support block 239. The cylindrical passage 234 is parallel to upper face 246 of the support block 239, and spaced from it so that the passage 238 is coaxial with the electrode 206. There is an interference fit between the electrode guide 216 and the passage 238 in the support block 239. The tight fit eliminates the need for any other means to hold the electrode guide 216 firmly in place in the support block 239.

One end portion 250 of a central passage through the electrode guide 216 engages the nozzle tip 32' of electrode 206. A short tapering portion 252 guides the nozzle tip 32' from one annular end face 254 of the electrode guide 216 into the cylindrical passage 250 which engages the outside of the nozzle tip to hold it against radial movement.

A workpiece 12' is inserted from an opposite annular end 256 of the electrode guide into a cylindrical passage 258 in the electrode guide 216. The cylindrical passage 258 is coaxial with passage 250 and holds the workpiece 12' against radial movement. The passage 258 has a larger diameter than the passage 250 to enable the passage 258 to accommodate the workpiece 12' which has a larger diameter than the tip end portion 32' of the electrode 206. A short tapering section 260 connects the end face 256 with passage 258 to guide the workpiece 12' into the passage.

A drain passage 280 is provided to permit electrolyte to drain out of the electrode guide 216 as the drilling proceeds. The passage 280 intersects and is perpendicular to the central axis of the passage 258. The drain passage 258 is located so that one portion of the surface which defines the passage (the left edge as viewed in FIG. 11) is nearly tangent to annular surface 218 which connects the electrode support passage 250 and the workpiece supporting passage 258. This location of the drain passage 258 permits electrolyte to drain even when the hole drilled has reached its full depth. Electrolyte discharged from the nozzle tip 32', hits the workpiece 12' and then flows back along the nozzle tip and out the drain passage 280.

The support block 239 for electrode guide 216 is provided with a U-shaped slot 284 which extends transverse to the longitudinal axis of passage 238. Slot 284 extends into the support block 239 and intersects cylindrical passage 236. Electrolyte draining from electrolyte drain passage 280 enters the slot 284 from which it may be collected for reuse.

In view of this descripiton, it is clear that the present invention provides a new and improved apparatus 10 for drilling relatively small holes in relatively small workpieces 12, 12a, 12b, and 12c such as suture needles (FIG. 2). A method and apparatus for electrochemically drilling holes is provided using a source of electrolyte 18 under pressure, an electrode 13 for directing a flow of electrolyte at a workpiece 12, means for applying an electric voltage 22 between the workpiece 12 and the electrolyte source 18 and means for moving 40 the electrode 13 toward the workpiece 12.

In one embodiment a generally tubular guide 60 engages both the electrode 13 and the workpiece 12 to assure that the two are in coaxial alignment during the hole drilling operation (FIG. 3). The guide 60 includes a tubular member 62 which slides over the main body portion 30 of the electrode 13. Inside the tube 62 are a pair of annular inserts 64 and 66, one of which engages the nozzle tip portion 32 of the electrode 13 to hold it securely in the center of the tube. The second annular insert 66 aligns the workpiece 12 with the nozzle tip portion 32 of the electrode 13 to assure that the hole is drilled along the central axis of the workpiece.

As the hole is drilled into the workpiece 12, the workpiece is moved toward the electrode 13 to maintain the space between the end 56 of the electrode and the bottom 54 of the hole constant (FIG. 4). The hole depth is limited by the insert 64 which supports the nozzle tip portion 32 of the electrode 13. When the hole has reached a predetermined depth, one end 74 of the insert 64 abuts the advancing end 73 of the workpiece 12, while the other end 77 of the insert 64 abuts the tapered portion 38 of the electrode 13 (FIG. 5). Thus by selecting the distance between the ends 73 and 74 of the insert 64 is it possible to select the finished hole depth.

In a second embodiment (FIG. 11), the electrode guide 216 and the electrode 206 are both connected with a rigid base 208. The workpiece 12' is mounted in a movable holder assembly similar to the one illustrated in FIG. 2. The drilling procedure used with the second embodiment is the same as that used with the first embodiment. When the hole has reached the desired depth, telescopic movement of the electrode nozzle tip 32' into the workpiece stops, and the electrode 206 is withdrawn.

When working on a relatively small workpiece 12 such as a suture needle, a relatively large amount of space is occupied by the parts 17, 18, 170, 172, 174, and 176 which supply electrolyte to the electrodes 13, 14, 15, and 16 (FIG. 2). In a machine adapted to drill a hole in each of a plurality of workpieces 12, 12a, 12b, and 12c simultaneously it is important to make the connections between the electrolyte source 18 and the electrodes 13, 14, 15, and 16 in as space-efficient a manner as possible. This has been accomplished by using electrodes 13, 14, 15 and 16 which have inlet portions 34, 34a, 34b, and 34c disposed at an angle to the main body portions 30, 30a, 30b, and 30c respectively. The main body portions 30, 30a, 30b, and 30c all lie in the same plane, and the inlet portions are paired 34 and 34a, and 34b and 34c, with one (34 and 34b) of each pair extending above the plane of the main body portions and the other one (34a and 34c) of each pair extending below the plane of the main body portions. This pattern of arranging the inlet portions 34, 34a, 34b, and 34c increases the space between adjacent inlet portions, and thus facilitates connecting each electrode with the electrolyte supply.

What is claimed is:

1. An apparatus for use in electrolytically removing material from a longitudinally extending workpiece, said apparatus comprising electrode means for directing a stream of electrolyte toward one end portion of the workpiece, said electrode means including a nozzle having an open end through which electrolyte flows toward the workpiece, means for supplying electrolyte under pressure to said nozzle, and guide means supported by said electrode means and extending between said electrode means and the workpiece for locating the open end of said nozzle and the workpiece in axial alignment with each other.

2. An apparatus as set forth in claim 1 wherein said nozzle and the workpiece each have longitudinally extending central axes and wherein said guide means telescopically receives said nozzle and the workpiece and holds them in axial alignment.

3. An apparatus as set forth in claim 1 further including electrode support means for supporting said electrode means and workpiece support means for supporting the workpiece, said electrode means including means for supporting the said guide means on said nozzle with said guide means spaced apart from said electrode support means and said workpiece support means.

4. An apparatus as set forth in claim 3 wherein the workpiece has a longitudinally extending central axis and said workpiece support means includes clamp means for releasably engaging the workpiece, said clamp means being effective to hold the workpiece against axial movement under the influence of a first axially applied force and to enable axial movement of the workpiece under the influence of a second axially applied force, said second force being in the same direction as and of larger magnitude than said first force.

5. An apparatus as set forth in claim 3 wherein said electrode means includes a cylindrical main body portion of a relatively large diameter and a nozzle tip portion having a relatively small diameter, and wherein said means for supporting said guide means on said nozzle includes the outside surface of said main body portion of said electrode means.

6. An apparatus as set forth in claim 1 wherein the workpiece has a longitudinally extending central axis, said electrode means includes a main body portion of a relatively large cross section and a cylindrical nozzle tip portion of a relatively small cross section, and said guide means includes a tubular member having an inside surface adapted to telescopically engage an outside surface of said main body portion of said electrode means, a first member having an outside surface firmly engaging said inside surface of said tubular member and an inside surface for telescopically engaging said nozzle tip portion of said electrode means, and a second member having an outside surface firmly engaging said inside surface of said tubular member and an inside surface for telescopically receiving the workpiece, said first member being spaced apart from a first end of said tubular member and from said second annular member.

7. An apparatus as set forth in claim 6 wherein said tubular member includes surface means defining an electrolyte flow passage extending between inside and outside surfaces of said tubular member, said surface means being disposed intermediate said first and second annular members.

8. An apparatus for use in forming a hole in one end portion of a workpiece by electrochemically removing material from the workpiece, said apparatus comprising electrode means for directing a stream of electrolyte toward the one end portion of the workpiece, means for supplying electrolyte under pressure to said electrode means, means for establishing an electrical potential between the electrolyte and the workpiece while the stream of electrolyte is being directed against the one end portion of the workpiece, guide means for positioning said electrode means and the one end portion of the workpiece relative to each other, said guide means including a housing which telescopically receives at least a portion of said electrode means and which telescopically receives the one end portion of the workpiece, and means for effecting relative movement between said electrode means and the workpiece to increase the extent of at least one of the telescopic relationships with said housing as the stream of electrolyte is being directed against the one end portion of the workpiece.

9. An apparatus as set forth in claim 8 wherein the workpiece has a longitudinal central axis, said electrode means includes a main body portion with a relatively large cross sectional area and a nozzle tip portion with a relatively small cross sectional area and a tapering portion connecting said main body portion with said nozzle tip portion, and said housing includes a tubular body which telescopically receives at least said nozzle tip portion of said electrode means, said tubular body having a first inside surface adapted to engage said nozzle tip portion of said electrode means and a second inside surface adapted to engage the workpiece to position the longitudinal axis of the workpiece in alignment with said nozzle tip portion.

10. An apparatus as set forth in claim 9 further including surface means for defining an electrolyte flow passage through said tubular body.

11. An apparatus as set forth in claim 9 and further including a stop surface disposed in said housing for limiting the extent of the telescopic relationship between said workpiece and said housing, workpiece support means for supporting the workpiece, said workpiece support means including clamp means for releasably engaging the workpiece, said clamp means being effective to hold the workpiece against axial motion under the influence of a first force applied to the workpiece by the stream of electrolyte and to enable axial motion of the workpiece under the influence of a second force applied against the workpiece by said stop surface, said second force being in the same direction as and larger than said first force.

12. An apparatus as set forth in claim 8 wherein said housing includes surface means for defining a cavity having first and second openings disposed in alignment with each other, said electrode means extending through said first opening into said cavity and the workpiece extending through said second opening into the cavity.

13. An apparatus as set forth in claim 12 further including passage means extending through said housing to said cavity for conducting electrolyte from said cavity during the formation of a hole in the workpiece.

14. An apparatus as set forth in claim 8 further including surface means in said housing for limiting the extent of the increase in the one telescopic relationship to a predetermined amount.

15. An apparatus for use in electrochemically drilling a hole in a workpiece with an electrode having a main body portion of relatively large cross section and a nozzle tip portion of relatively small cross section connected with the main body portion by a tapering portion, said apparatus comprising guide means for aligning the workpiece with the nozzle tip portion, said guide means including a tubular member adapted to telescopically receive the main body portion of the electrode, first insert means disposed within said tubular member for engaging the nozzle tip portion of the electrode, and second insert means disposed within said tubular member for engaging the workpiece, said first and second insert means being disposed in a coaxial relationship with each other to hold the workpiece in axial alignment with the nozzle tip portion.

16. An apparatus as set forth in claim 15 wherein said first insert means includes surface means for abuttingly engaging the tapered portion of the electrode to position the electrode and tubular member relative to each other, and surface means for limiting the depth of the hole drilled by engaging an end surface of the workpiece when the hole has reached a predetermined depth.

17. An apparatus as set forth in claim 15 wherein said first insert means is annular and said first surface means for engaging the nozzle tip portion of the electrode includes surface means for defining a cylindrical central passage through said first insert means.

18. An apparatus as set forth in claim 15 wherein said second insert means is annular and said second surface means for engaging the workpiece includes surface means for defining a cylindrical central passage through said second insert means.

19. An apparatus as set forth in claim 15 further including surface means for defining a passage interconnecting the inside and outside surfaces of said tubular member, said surface means being disposed intermediate said first and second insert means.

20. A method of drilling a hole in an axially extending workpiece, said method comprising the steps of providing an electrode, providing a guide to position the workpiece and electrode relative to each other, telescopically inserting the electrode into the guide, telescopically inserting the workpiece into the guide, supplying electrolyte under pressure to a passage through the electrode, providing an electrical potential between the electrolyte and the workpiece, and directing a flow of electrolyte from the electrode against the portion of the workpiece in the guide to electrochemically drill a hole in the workpiece.

21. A method as set forth in claim 20 wherein the step of directing a flow of electrolyte from the electrode against the workpiece includes the step of causing relative movement between the workpiece and the electrode in a direction parallel to the axis of the workpiece to form an axially extending hole in the workpiece.

22. A method as set forth in claim 21 further including the steps of engaging the workpiece with a holder, applying a first axially directed force against the workpiece by performing said step of directing a flow of electrolyte against the workpiece, holding the workpiece against axial motion relative to the holder under the influence of the first force, engaging a stop surface with the workpiece when the hole in the workpiece reaches a predetermined axial extent, applying a second axially directed force against the workpiece with the stop surface after the hole has reached the predetermined axial extent, and allowing the workpiece to move axially relative to the holder under the influence of the second force.

23. A method of forming a hole extending along a longitudinal axis of a workpiece, said method comprising the steps of providing an electrode having a nozzle, supporting a guide on the electrode, positioning the workpiece in axial alignment with the nozzle by engaging the workpiece with the guide while the guide is supported by the electrode, directing a flow of electrolyte against the workpiece with the nozzle while the workpiece is held in axial alignment with the nozzle by the guide, and establishing an electrical potential between the electrolyte and the workpiece while the flow of electrolyte is being directed against the workpiece.

24. A method as set forth in claim 23 further including the step of effecting relative movement between the electrode and the workpiece while the flow of electrolyte is being directed against the workpiece.

25. An apparatus for electrochemically removing material from a plurality of workpieces, said apparatus comprising a plurality of electrodes for directing a flow of electrolyte, each of said electrodes having a longitudinally extending main body portion and a longitudinally extending inlet portion connected in fluid communication with said main body portion, said inlet portion of each of said electrodes having a central axis disposed at an angle to the main body portion of the associated one of said electrodes, means for supplying electrolyte under pressure to each of said electrodes, means for establishing an electric potential between the electrolyte and the workpieces, and electrode support means for supporting said main body portions of said plurality of electrodes in a side-by-side arrangement, said plurality of electrodes including first and second groups of electrodes, said first group of electrodes having inlet end portions extending in a first direction from the body portions of the electrodes of said first group of electrodes, said second group of electrodes having inlet end portions extending in a second direction from the body portions of said second group of electrodes, said first direction being transverse to said second direction, said two groups of electrodes being interspersed so that adjacent ones of said electrodes have inlet portions which diverge to facilitate connection of said inlet portions with said means for supplying electrolyte under pressure.

26. An apparatus as set forth in claim 25 wherein said main body portions of said electrodes have central axes disposed in a common plane.

27. An apparatus as set forth in claim 25 further including a plurality of guide means, each of said guide means being associated with one of said electrodes and extending between the associated one of said electrodes and an associated one of the workpieces for locating an end of the associated one of said electrodes and the associated one of said workpieces in axial alignment with each other.

28. An apparatus as set forth in claim 27 wherein each of said electrodes and each of the workpieces have longitudinally extending central axes and wherein each of said guide means telescopically receives and associated one of said electrodes and an associated one of said workpieces and holds them in axial alignment.

29. An apparatus as set forth in claim 25 wherein the workpieces have a longitudinally extending central axes, each of said plurality of electrodes includes a cylindrical nozzle tip portion of a relatively small cross section, and each of said guide means includes a tubular member having an inside surface adapted to telescopically engage an outside surface of said main body portion of an associated one of said electrodes, a first member having an outside surface firmly engaging said inside surface of said tubular member and an inside surface for telescopically engaging said nozzle tip portion of an associated one of said electrodes, and a second member having an outside surface firmly engaging said inside surface of said tubular member and an inside surface for telescopically receiving an associated one of the workpieces, said first member being spaced apart from a first end of said tubular member and from said second annular member.

30. An apparatus as set forth in claim 25, said apparatus further including a plurality of guide means each of said guide means being for positioning an associated one of said electrodes and an end portion of an associated workpiece relative to each other, each of said guide means including a housing which telescopically receives at least a portion of the associated one of said electrodes and which telescopically receives the one end portion of the associated workpiece, said apparatus further including means for effecting relative movement between said electrodes and the workpieces to increase the extent of at least one of the telescopic relationships as the stream of electrolyte is being directed against the one end portion of the workpiece.

31. An apparatus as set forth in claim 30 wherein each of the workpieces has a longitudinal central axis, each of said electrodes includes a main body portion with a relatively large cross sectional area and a nozzle tip portion with a relatively small cross sectional area and a tapering portion connecting said main body portion with said nozzle tip portion, and each of said housings includes a tubular body which telescopically receives the main body portion of an associated one of said electrodes, each of said tubular bodies having a first inside surface adapted to engage the nozzle tip portion of an associated electrode and a second inside surface adapted to engage an associated one of the workpieces to position the longitudinal axis of the associated one of the workpieces in alignment with the nozzle tip portion of the corresponding one of said electrodes.

32. An apparatus for use in electrochemically removing material from a workpiece to form an axially extending hole therein, said apparatus comprising an electrode having a main body portion, a nozzle with a tapered portion and a tip with an open end, said tapered portion being disposed intermediate said main body portion and said tip portion, and stop means supported by said electrode for limiting the depth of the hole formed with said apparatus, said stop means including first surface means circumscribing said tip portion of said electrode for engaging the end of the workpiece when the hole reaches a predetermined depth.

33. An apparatus as set forth in claim 32 wherein said stop means further includes second surface means disposed in abutting engagement with said tapered portion of said nozzle for locating said first surface means relative to said tip of said electrode.

34. An apparatus as set forth in claim 33 further including a tubular member connected with said stop means and engaging the main body portion of said electrode to support said stop means on said electrode.

35. An apparatus as set forth in claim 32 further including guide means for engaging the workpiece to position the workpiece relative to said tip of said electrode.

36. An apparatus as set forth in claim 35 wherein said nozzle and the workpiece each have longitudinally extending central axes and wherein said guide means telescopically receives said nozzle and the workpiece and holds then in axial alignment.

37. An apparatus as set forth in claim 35 further including electrode support means for supporting said electrode means and workpiece support means for supporting workpiece, said electrode means including means for supporting said guide means on said nozzle with said guide means spaced apart from said electrode support means and said workpiece support means.

38. An apparatus as set forth in claim 32 further including guide means for positioning said electrode and one end portion of the workpiece relative to each other, said guide means including a housing which telescopically receives at least a portion of said electrode and which telescopically receives the one end portion of the workpiece, and means for effecting relative movement between said electrode means and the workpiece to increase the extent of at least one of the telescopic relationships with said housing as the stream of electrolyte is being directed against the one end portion of the workpiece.

39. An apparatus as set forth in claim 38 wherein the workpiece has a longitudinal central axis, and said housing includes a tubular body which telescopically receives said main body portion of said electrode means, said tubular body having a first inside surface adapted to engage said tip portion of said electrode and a second inside surface adapted to engage the workpiece to position the longitudinal axis of the workpiece in alignment with said tip portion.

40. An apparatus as set forth in claim 39 further including surface means for defining an electrolyte flow passage through said tubular body.

41. An apparatus as set forth in claim 39 wherein said housing includes surface means for defining a cavity having first and second openings disposed in alignment with each other, said electrode extending through said first opening into said cavity and the workpiece extending through said second opening into the cavity.

42. An apparatus for use in electrochemically removing material from a longitudinally extending workpiece, said apparatus comprising electrode means for directing a stream of electrolyte toward one end portion of a workpiece, said electrode means including a nozzle having a longitudinally extending tip end portion, means for supplying electrolyte under pressure to said nozzle, and guide means for locating said tip end portion of said nozzle and the workpiece in alignment with each other, said guide means including first surface means for engaging said tip end portion of said nozzle and second surface means for engaging the workpiece.

43. An apparatus as set forth in claim 42 wherein said guide means includes an axially extending member having surface means for at least partially defining a first axially extending passage having a first cross section, said first passage being adapted to telescopically receive said tip end portion of said electrode means, surface means for at least partially defining a second axially extending passage having a second cross section larger than said first cross section, said second passage being adapted to telescopically receive the workpiece in axial alignment with said electrode means, and surface means for at least partially defining a third passage extending transverse to the axis of said cylindrical member at an axial location proximate the intersection of said first and second passages, said third passage being adapted to enable electrolyte to drain from said cylindrical member during an electrochemical machining operation.

44. An apparatus as set forth in claim 42 wherein said electrode means includes a main body portion in fluid communication with said tip end portion and having a larger cross section than said tip end portion, and further including electrode support means for supporting said electrode means by engaging said main body portion and guide support means for supporting said guide means in alignment with said electrode means, said electrode support means and said guide support means being connected with one another.

45. An apparatus as set forth in claim 44 wherein said electrode support means includes an electrode support plate having an axially extending first groove and a clamp member having an opposed axially extending second groove, and means for causing said first groove and said second groove to engage opposite sides of said main body portion of said electrode means by urging said clamp member and said base member toward each other, said guide support means including a guide block having a passage therethrough at least partially defined by surface means for engaging the outside surface of said guide means.

46. An apparatus as set forth in claim 45 wherein said guide means includes a generally cylindrical member having surface means for at least partially defining a first axially extending passage having a first cross section, said first passage being adapted to telescopically receive said tip end portion of said electrode means, surface means for at least partially defining a second axially extending passage having a second cross section larger than said first cross section, said second passage being adapted to telescopically receive the workpiece in axial alignment with said electrode means, and surface means for at least partially defining a third passage extending transverse to the axis of said cylindrical member at an axial location proximate the intersection of said first and second passages, said third passage being adapted to enable electrolyte to drain from said cylindrical member during an electrochemical machining operation.

* * * * *